United States Patent
Jiang et al.

(10) Patent No.: US 9,900,501 B2
(45) Date of Patent: Feb. 20, 2018

(54) IMAGE COLLECTING METHOD AND APPARATUS

(71) Applicant: Huawei Technologies Co., Ltd., Shenzhen (CN)

(72) Inventors: Hongrui Jiang, Shenzhen (CN); Yunbin Wang, Shenzhen (CN); Kunpeng Li, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/939,329

(22) Filed: Nov. 12, 2015

(65) Prior Publication Data
US 2016/0065847 A1   Mar. 3, 2016

Related U.S. Application Data

(63) Continuation of application No. PCT/CN2014/078757, filed on May 29, 2014.

(51) Int. Cl.
*H04N 5/225* (2006.01)
*H04N 5/228* (2006.01)
(Continued)

(52) U.S. Cl.
CPC ......... *H04N 5/23222* (2013.01); *G06F 3/017* (2013.01); *H04M 1/65* (2013.01);
(Continued)

(58) Field of Classification Search
CPC ................. G06F 3/017; H04N 5/23222; H04N 5/23258; H04N 5/772; H04M 1/65; H04M 1/0264
See application file for complete search history.

(56) References Cited

U.S. PATENT DOCUMENTS 8,391,697 B2 * 3/2013 Cho .................. G03B 17/20
348/208.16
9,354,709 B1 * 5/2016 Heller .................. G06F 3/017
(Continued)

FOREIGN PATENT DOCUMENTS

CN    101341734 A    1/2009
CN    101403848 A    4/2009
(Continued)

OTHER PUBLICATIONS

Foreign Communication From a Counterpart Application, PCT Application No. PCT/CN2014/078757, English Translation of International Search Report dated Mar. 4, 2015, 2 pages.
(Continued)

*Primary Examiner* — Twyler Haskins
*Assistant Examiner* — Carramah J Quiett
(74) *Attorney, Agent, or Firm* — Conley Rose, P.C.

(57) ABSTRACT

An image collecting method and apparatus are provided, where the image collecting method includes enabling an image collecting unit in an electronic device, when it is identified that after a first specific motion, a gesture of the electronic device changes to a specific device gesture; monitoring whether the electronic device performs a second specific motion in the specific device gesture; and when it is detected that the electronic device performs the second specific motion in the specific device gesture, controlling the image collecting unit to obtain an at least first image by means of collection within motion time in which the electronic device performs the second specific motion.

6 Claims, 3 Drawing Sheets

Enable an image collecting unit in an electronic device, when it is identified that after a first specific motion, a gesture of the electronic device changes to a specific device gesture — S101

Monitor whether the electronic device performs a second specific motion in the specific device gesture — S102

When it is detected that the electronic device performs the second specific motion in the specific device gesture, control the image collecting unit to obtain an at least first image by means of collection within motion time in which the electronic device performs the second specific motion — S103

(51) Int. Cl.
- *H04N 5/232* (2006.01)
- *H04M 1/65* (2006.01)
- *G06F 3/01* (2006.01)
- *H04N 5/77* (2006.01)
- *H04M 1/02* (2006.01)

(52) U.S. Cl.
CPC ......... *H04N 5/23258* (2013.01); *H04N 5/772* (2013.01); *H04M 1/0264* (2013.01)

(56) References Cited

U.S. PATENT DOCUMENTS

| | | | |
|---|---|---|---|
| 9,442,564 | B1* | 9/2016 | Dillon .................... G06F 3/012 |
| 2005/0237383 | A1 | 10/2005 | Soga |
| 2006/0071904 | A1 | 4/2006 | Cho et al. |
| 2010/0171846 | A1 | 7/2010 | Wood et al. |
| 2010/0208118 | A1* | 8/2010 | Ueyama ............. H04N 5/23293 348/333.01 |
| 2010/0317408 | A1 | 12/2010 | Ferren et al. |
| 2011/0092248 | A1 | 4/2011 | Evanitsky |
| 2011/0199470 | A1 | 8/2011 | Moller et al. |
| 2014/0147092 | A1 | 5/2014 | Liu et al. |
| 2015/0130893 | A1 | 5/2015 | Kimura |

FOREIGN PATENT DOCUMENTS

| | | | |
|---|---|---|---|
| CN | 102679945 | A | 9/2012 |
| CN | 102714698 | A | 10/2012 |
| CN | 102879976 | A | 1/2013 |
| CN | 102938808 | A | 2/2013 |
| CN | 103761041 | A | 4/2014 |
| CN | 103823654 | A | 5/2014 |
| GB | 2416036 | | 1/2006 |
| GB | 2508245 | A | 5/2014 |
| JP | 2010193245 | A | 9/2010 |
| JP | 2012530320 | A | 11/2012 |
| KR | 20060030456 | A | 4/2006 |
| WO | 2011098899 | A1 | 8/2011 |
| WO | 2013183347 | A1 | 12/2013 |

OTHER PUBLICATIONS

Foreign Communication From a Counterpart Application, PCT Application No. PCT/CN2014/078757, Written Opinion dated Mar. 4, 2015, 4 pages.
Foreign Communication From a Counterpart Application, European Application No. 14890460.0, Extended European Search Report dated Jul. 8, 2016, 8 pages.
Machine Translation and Abstract of Chinese Publication No. CN101403848, dated Apr. 8, 2009, 9 pages.
Machine Translation and Abstract of Chinese Publication No. CN102679945, dated Sep. 19, 2012, 10 pages.
Machine Translation and Abstract of Chinese Publication No. CN103761041, dated Apr. 30, 2014, 14 pages.
Machine Translation and Abstract of Chinese Publication No. CN103823654, dated May 28, 2014, 7 pages.
Foreign Communication From a Counterpart Application, Chinese Application No. 201480001447.9, Chinese Office Action dated Apr. 14, 2017, 7 pages.
Foreign Communication From a Counterpart Application, Korean Application No. 2016-7027342, Korean Office Action dated May 15, 2017, 5 pages.
Foreign Communication From a Counterpart Application, Korean Application No. 2016-7027342, English Translation of Korean Office Action dated May 15, 2017, 5 pages.
Machine Translation and Abstract of Chinese Publication No. CN102879976, Jan. 16, 2013, 9 pages.
Foreign Communication From a Counterpart Application, Chinese Application No. 201480001447.9, Chinese Office Action dated Sep. 30, 2017, 8 pages.
Machine Translation and Abstract of Japanese Publication No. JP2010193245, Feb. 19, 2009, 32 pages.
Foreign Communication From a Counterpart Application, Japanese Application No. 2016-559900, Japanese Office Action dated Oct. 17, 2017, 5 pages.
Foreign Communication From a Counterpart Application, Japanese Application No. 2016-559900, English Translation of Japanese Office Action dated Oct. 17, 2017, 6 pages.

* cited by examiner

IMAGE COLLECTING METHOD AND APPARATUS

CROSS-REFERENCE TO RELATED APPLICATIONS

This application is a continuation of International Application No. PCT/CN2014/078757, filed on May 29, 2014, which is hereby incorporated by reference in its entirety.

TECHNICAL FIELD

The present disclosure relates to the field of electronic technologies, and in particular, to an image collecting method and apparatus.

BACKGROUND

With development of electronic technologies, functions such as photographing and video recording are integrated into a handheld electronic device, such as a smartphone or a PAD (tablet computer). However, when a user uses another function of a handheld electronic device or when a handheld electronic device is in a screen-locked state, the user often encounters a case that an image collecting function needs to be quickly enabled to take a snapshot. In order to quickly enable the image collecting function, a camera application cannot be enabled using a general program.

To take a snapshot, a technical solution provided in the prior art is as follows. An electronic device determines whether a user performs an action on the electronic device, and if yes, enables a photographing function after the action stops. Therefore, it can be learned that, only after a motion of the electronic device stops, an image collecting function can be correspondingly enabled and an image collecting action can be performed, and therefore, the technical solution provided in the prior art has a technical problem of a relatively long time for enabling the image collecting function.

SUMMARY

The present disclosure provides an image collecting method and apparatus, so as to solve a technical problem of a relatively long time for enabling an image collecting function in the prior art.

According to a first aspect, the present disclosure provides an image collecting method, including enabling an image collecting unit in an electronic device, when it is identified that after a first specific motion, a gesture of the electronic device changes to a specific device gesture; monitoring whether the electronic device performs a second specific motion in the specific device gesture; and when it is detected that the electronic device performs the second specific motion in the specific device gesture, controlling the image collecting unit to obtain an at least first image by means of collection within motion time in which the electronic device performs the second specific motion.

With reference to the first aspect, in a first possible implementation manner, the second specific motion is a motion between which and the first specific motion a time interval is less than set duration.

With reference to the first aspect, in a second possible implementation manner, the enabling an image collecting unit in an electronic device, when it is identified that after a first specific motion, a gesture of the electronic device changes to a specific device gesture includes, in a process that after a first device motion, the electronic device changes from a first device gesture to the specific device gesture, acquiring, using a first motion sensor in the electronic device, a first sensing parameter of the electronic device in a process of the first device motion; determining, according to a variation of the first sensing parameter, whether the first device motion is the first specific motion; and if yes, enabling the image collecting unit.

With reference to the second possible implementation manner of the first aspect, in a third possible implementation manner, the determining, according to a variation of the first sensing parameter, whether the first device motion is the first specific motion includes performing characteristic extraction on the first sensing parameter and determining a first motion characteristic of the first device motion; inputting the first motion characteristic into a first motion calculation model for calculation, where the first motion calculation model is a calculation model obtained using a Support Vector Machine (SVM) algorithm to analyze historical data that is generated when the electronic device performs the first specific motion for multiple times; and determining, according to a calculation result, whether the first device motion is the first specific motion.

With reference to the first aspect, the first possible implementation manner of the first aspect, the second possible implementation manner of the first aspect, or the third possible implementation manner of the first aspect, in a fourth possible implementation manner, the controlling the image collecting unit to obtain an at least first image by means of collection within motion time in which the electronic device performs the second specific motion includes, within the motion time in which the electronic device performs the second specific motion, controlling the image collecting unit to perform one photographing action at a preset time interval, so as to obtain, by means of collection, multiple photos including the at least first image; or within the motion time of the second specific motion, controlling the image collecting unit to perform video recording, so as to acquire, by means of collection, a video including the at least first image.

With reference to the fourth possible implementation manner of the first aspect, in a fifth possible implementation manner, the monitoring whether the electronic device performs a second specific motion in the specific device gesture includes, when the electronic device performs the second device motion in the specific device gesture, acquiring, using a second motion sensor in the electronic device, a second sensing parameter at a current moment; and inputting the second sensing parameter into a second motion calculation model for calculation, so as to determine whether the electronic device at the current moment is in a process of performing the second specific motion in the specific device gesture, where the second motion calculation model is a calculation model obtained using an SVM algorithm to analyze historical data that is generated when the electronic device performs the second specific motion for multiple times.

According to a second aspect, the present disclosure provides an electronic device, including a memory configured to store a program instruction; and a processor configured to acquire the program instruction, so as to perform the following steps: enabling an image collecting unit in the electronic device, when it is identified that after a first specific motion, a gesture of the electronic device changes to a specific device gesture; monitoring whether the electronic device performs a second specific motion in the specific device gesture; and when it is detected that the electronic device performs the second specific motion in the specific device gesture, controlling the image collecting unit to obtain an at least first image by means of collection within motion time in which the electronic device performs the second specific motion.

With reference to the second aspect, in a first possible implementation manner, the processor is configured to monitor whether the second specific motion is a motion between which and the first specific motion a time interval is less than set duration.

With reference to the first possible implementation manner of the second aspect, in a second possible implementation manner, the processor is configured to, in a process that after a first device motion, the electronic device changes from a first device gesture to the specific device gesture, acquire, using a first motion sensor in the electronic device, a first sensing parameter of the electronic device in a process of the first device motion; determine, according to a variation of the first sensing parameter, whether the first device motion is the first specific motion; and if yes, enable the image collecting unit.

With reference to the second possible implementation manner of the second aspect, in a third possible implementation manner, the processor is configured to perform characteristic extraction on the first sensing parameter and determine a first motion characteristic of the first device motion; input the first motion characteristic into a first motion calculation model for calculation, where the first motion calculation model is a calculation model obtained using an SVM algorithm to analyze historical data that is generated when the electronic device performs the first specific motion for multiple times; and determine, according to a calculation result, whether the first device motion is the first specific motion.

With reference to the second aspect, the first possible implementation manner of the second aspect, the second possible implementation manner of the second aspect, or the third possible implementation manner of the second aspect, in a fourth possible implementation manner, the processor is further configured to, within the motion time of the second specific motion, control the image collecting unit to perform one photographing action at a preset time interval, so as to obtain, by means of collection, multiple photos including the at least first image; or within the motion time of the second specific motion, control the image collecting unit to perform video recording, so as to acquire, by means of collection, a video including the at least first image.

With reference to the fourth possible implementation manner of the second aspect, in a fifth possible implementation manner, the processor is further configured to, when the electronic device performs the second device motion in the specific device gesture, acquire, using a second motion sensor in the electronic device, a second sensing parameter at a current moment; and input the second sensing parameter into a second motion calculation model for calculation, so as to determine whether the electronic device at the current moment is in a process of performing the second specific motion in the specific device gesture, where the second motion calculation model is a calculation model obtained using an SVM algorithm to analyze historical data that is generated when the electronic device performs the second specific motion for multiple times.

According to a third aspect, the present disclosure provides an apparatus, including an identifying unit configured to identify whether after a first specific motion, a gesture of an electronic device changes to a specific device gesture; an enabling unit configured to enable an image collecting unit in the electronic device, when the identifying unit identifies that after the first specific motion, the gesture of the electronic device changes to the specific device gesture; a monitoring unit configured to monitor whether the electronic device performs a second specific motion in the specific device gesture; and a control unit configured to, when the monitoring unit detects that the electronic device performs the second specific motion in the specific device gesture, control the image collecting unit to obtain an at least first image by means of collection within motion time in which the electronic device performs the second specific motion.

With reference to the third aspect, in a first possible implementation manner, the monitoring unit is configured to monitor whether the second specific motion is a motion between which and the first specific motion a time interval is less than set duration.

With reference to the first possible implementation manner of the third aspect, in a second possible implementation manner, the identifying unit includes a first acquiring subunit configured to, in a process that after a first device motion, the electronic device changes from a first device gesture to the specific device gesture, acquire, using a first motion sensor in the electronic device, a first sensing parameter of the electronic device in a process of the first device motion; and a determining subunit configured to determine, according to a variation of the first sensing parameter, whether the first device motion is the first specific motion; where the enabling unit is configured to, if the determining subunit determines that the first device motion is the first specific motion, enable the image collecting unit.

With reference to the second possible implementation manner of the third aspect, in a third possible implementation manner, the first acquiring subunit is configured to perform characteristic extraction on the first sensing parameter and determine a first motion characteristic of the first device motion; input the first motion characteristic into a first motion calculation model for calculation, where the first motion calculation model is a calculation model obtained using an SVM algorithm to analyze historical data that is generated when the electronic device performs the first specific motion for multiple times; and determine, according to a calculation result, whether the first device motion is the first specific motion.

With reference to the third aspect, the first possible implementation manner of the third aspect, the second possible implementation manner of the third aspect, or the third possible implementation manner of the third aspect, in a fourth possible implementation manner, the control unit is configured to, within the motion time of the second specific motion, control the image collecting unit to perform one photographing action at a preset time interval, so as to obtain, by means of collection, multiple photos including the at least first image; or within the motion time of the second specific motion, control the image collecting unit to perform video recording, so as to acquire, by means of collection, a video including the at least first image.

With reference to the fourth possible implementation manner of the third aspect, in a fifth possible implementation manner, the monitoring unit includes a second acquiring subunit configured to, when the electronic device performs the second device motion in the specific device gesture, acquire, using a second motion sensor in the electronic device, a second sensing parameter at a current moment; and a determining subunit configured to input the second sensing parameter into a second motion calculation model for calculation, so as to determine whether the electronic device at the current moment is in a process of performing the second specific motion in the specific device gesture, where the second motion calculation model is a calculation model obtained using an SVM algorithm to analyze historical data that is generated when the electronic device performs the second specific motion for multiple times.

The technical solutions disclosed in the present disclosure have at least the following technical effects.

According to the present disclosure, an image collecting unit in an electronic device is enabled when it is identified that after a first specific motion, a gesture of the electronic device changes to a specific device gesture; whether the electronic device performs a second specific motion in the specific device gesture is monitored; and when it is detected that the electronic device performs the second specific motion in the specific device gesture, the image collecting unit is controlled to obtain an at least first image by means of collection within motion time in which the electronic device performs the second specific motion. Therefore, it can be learned that when identifying the first specific motion, the electronic device can automatically enable the image collecting unit and enter a state of preparing for image collection, and then the electronic device can perform image collection within the motion time of the identified second specific motion. Therefore, in a process of a user action, the electronic device can automatically enable the image collecting unit to complete photographing, which avoids a problem that the electronic device can perform image collection only after the user action is completed, thereby implementing a quick and natural automatic snapshot.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
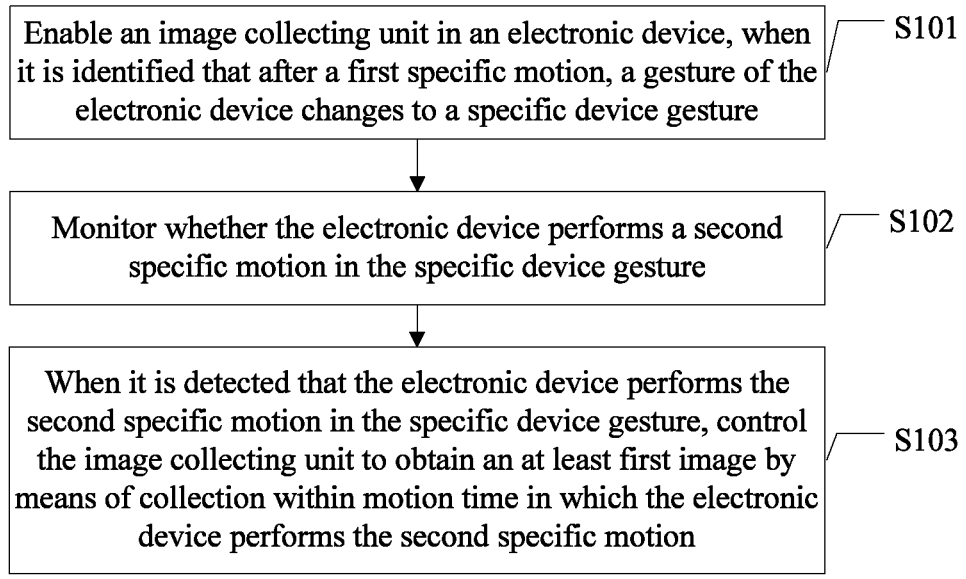
FIG. 1 is a schematic diagram of an image collecting method according to an embodiment of the present disclosure.

FIG. 1 is a schematic diagram of an image collecting method according to an embodiment of the present disclosure, where the method is applied to an electronic device including an image collecting unit, for example, a smart handheld device such as a mobile phone or a PAD (tablet computer). Referring to FIG. 1, the image collecting method provided in this embodiment of the present disclosure includes the following procedures.

S101: Enable an image collecting unit in an electronic device, when it is identified that after a first specific motion, a gesture of the electronic device changes to a specific device gesture.

For example, the electronic device includes a displaying unit, and the specific device gesture may be an upright state that the displaying unit of the electronic device is perpendicular to a horizontal plane, or a horizontal state that the displaying unit of the electronic device is parallel to a horizontal plane. The specific device gesture may also be another self-defined device gesture. The electronic device senses, using a gravity sensor, whether the electronic device is in the specific device gesture.

Optionally, S101 includes the following procedures. In a process that after a first device motion, the electronic device changes from a first device gesture different from the specific device gesture to the specific device gesture, acquiring, using a first motion sensor in the electronic device, a first sensing parameter of the electronic device in a process of the first device motion; determining, according to a variation of the first sensing parameter, whether the first device motion is the first specific motion; and if yes, enabling the image collecting unit.

The first motion sensor may use one or more sensors of an acceleration sensor, a gyroscope, and a gravity sensor, so as to record the first sensing parameter in the process of the first device motion. For example, the acceleration sensor is used to record all acceleration values on the X-axis, the Y-axis, and the Z-axis of the acceleration sensor in the process of the first device motion, and the all acceleration values are used as the first sensing parameter.

When it is sensed, using the gravity sensor, that the electronic device is in the specific device gesture, preprocessing is performed on the first sensing parameter recorded in the process of the first device motion. For example, the preprocessing may be smoothing processing performed on the first sensing parameter in a manner of an active window. Then, characteristic extraction is performed on a preprocessed first sensing parameter, so as to determine a first motion characteristic of the first device motion; and then the first motion characteristic is input into a first motion calculation model for calculation, and it is determined, according to a calculation result, whether the first device motion is the first specific motion.

In an implementation process, the first motion calculation model is a calculation model obtained using an SVM algorithm to analyze historical data that is generated when the electronic device performs the first specific motion for multiple times. The historical data analyzed using the SVM algorithm is historical data obtained by performing preprocessing and normalization processing on sensing data collected in a process of performing the first specific motion for multiple times, and performing processing on normalization-processed sensing data using a method such as an interpolation method or a sampling method, where processing of the interpolation method or the sampling method cancels dependence between motion amplitude and duration.

It can be learned from the foregoing description of S101 that the first specific motion can be accurately identified when calculation is performed according to the first motion calculation model, which is more accurate than a determining manner of enabling an image collecting function in the prior art, thereby reducing a probability of mistakenly enabling the image collecting function.

S102: Monitor whether the electronic device performs a second specific motion in the specific device gesture.

The specific device gesture in S102 and the specific device gesture in S101 may be a same device gesture, or the specific device gesture in S102 and the specific device gesture in S101 may be different device gestures.

In order to more accurately determine whether an action performed by a user on the electronic device is a need of performing image collection, the second specific motion may be defined as a motion between which and the first specific motion a time interval is less than set duration.

In order to conveniently collect an image, the second specific motion is defined as a translational motion, so as to collect different images during the translational motion. For example, the translational motion may be an up and down translation, a left and right translation, or a forward and backward translation relative to the user.

Optionally, S102 includes the following procedures. When the electronic device performs the second device motion in the specific device gesture, acquiring, using a second motion sensor in the electronic device, a second sensing parameter at a current moment; and inputting the second sensing parameter into a second motion calculation model for calculation, so as to determine whether the electronic device at the current moment is in a process of performing the second specific motion in the specific device gesture.

The second motion sensor and the first motion sensor may be a same sensor in the electronic device. For example, both the second motion sensor and the first motion sensor are an acceleration sensor. Or the second motion sensor and the first motion sensor may be different types of sensors applied to the electronic device. For example, the first motion sensor is a gyroscope and the second motion sensor is an acceleration sensor. The second motion calculation model is a calculation model obtained using an SVM algorithm to analyze historical data that is generated when the electronic device performs the second specific motion for multiple times. The historical data analyzed using the SVM algorithm is historical data obtained by performing preprocessing and normalization processing on sensing data collected in a process of performing the second specific motion for multiple times, and performing processing on normalization-processed sensing data using a method such as an interpolation method or a sampling method.

For example, when the specific device gesture is an upright state and the second specific motion is a left and right translation, the second motion calculation model is a calculation model obtained using an SVM algorithm to analyze historical data that is generated when the electronic device performs a translational motion in the upright state for multiple times. It is assumed that acceleration values at a current moment of an acceleration sensor on the X-axis, the Y-axis, and the Z-axis are input into the second motion calculation model for calculation, and when the acceleration values at the current moment on the X-axis, the Y-axis, and the Z-axis satisfy the second motion calculation model, it indicates that the electronic device at the current moment is in a process of performing the translational motion in the upright state, such that image collection does not stop.

It can be learned from the foregoing description of S102 that, whether the electronic device is currently in a process of performing the second specific motion can be accurately determined when calculation is performed according to the second motion calculation model. Therefore, image collection can be performed only in a motion process of the second specific motion, such that image collection can naturally stop when the second specific motion stops, thereby improving user experience.

S103: When it is detected that the electronic device performs the second specific motion in the specific device gesture, control the image collecting unit to obtain an at least first image by means of collection within motion time in which the electronic device performs the second specific motion.

If the second specific motion is defined as a motion between which and the first specific motion a time interval is less than set duration, and an example that the duration is defined as 0.5 seconds is used for description, after the first specific motion, whether within 0.5 seconds after the first specific motion, the electronic device performs a translational motion in the specific device gesture is monitored. If no translational motion is performed within 0.5 seconds, for example, no translational motion is performed or a translational motion is performed after 0.5 seconds, the image collecting unit does not perform image collection.

It can be learned that, if the second specific motion is defined as a motion between which and the second specific motion a time interval is less than set duration, it may be avoided that an action that a user picks up a mobile phone to use another function is mistakenly determined as a need of performing image collection, such that identification is more accurate.

Optionally, the step of controlling the image collecting unit to obtain the at least first image by means of collection within the motion time of the second specific motion includes the following two implementation manners.

Implementation Manner 1: within the motion time of the second specific motion, controlling the image collecting unit to perform one photographing action at a preset time interval, so as to obtain, by means of collection, multiple photos including the at least first image. Implementation Manner 1 is applied to a photographing scenario. For example, if the preset time interval is 0.5 seconds, within the motion time of the second specific motion, one photographing action is performed every 0.5 seconds, and a photographing action stops when it is detected that the second specific motion ends. Therefore, in Implementation Manner 1, a user can naturally take consecutive snapshots without any omission in the second specific motion.

Implementation Manner 2: within the motion time of the second specific motion, controlling the image collecting unit to perform video recording, so as to acquire, by means of collection, a video including the at least first image. Implementation Manner 2 is applied to a video recording scenario. Video recording stops when it is detected that the second specific motion ends, such that a complete video corresponding to the second specific motion is formed. Therefore, in Implementation Manner 2 that more satisfies a video recording feature, a video required by a user can be recorded in a process of the second specific motion, and start and stop of video recording are completed naturally.

Figure 2:
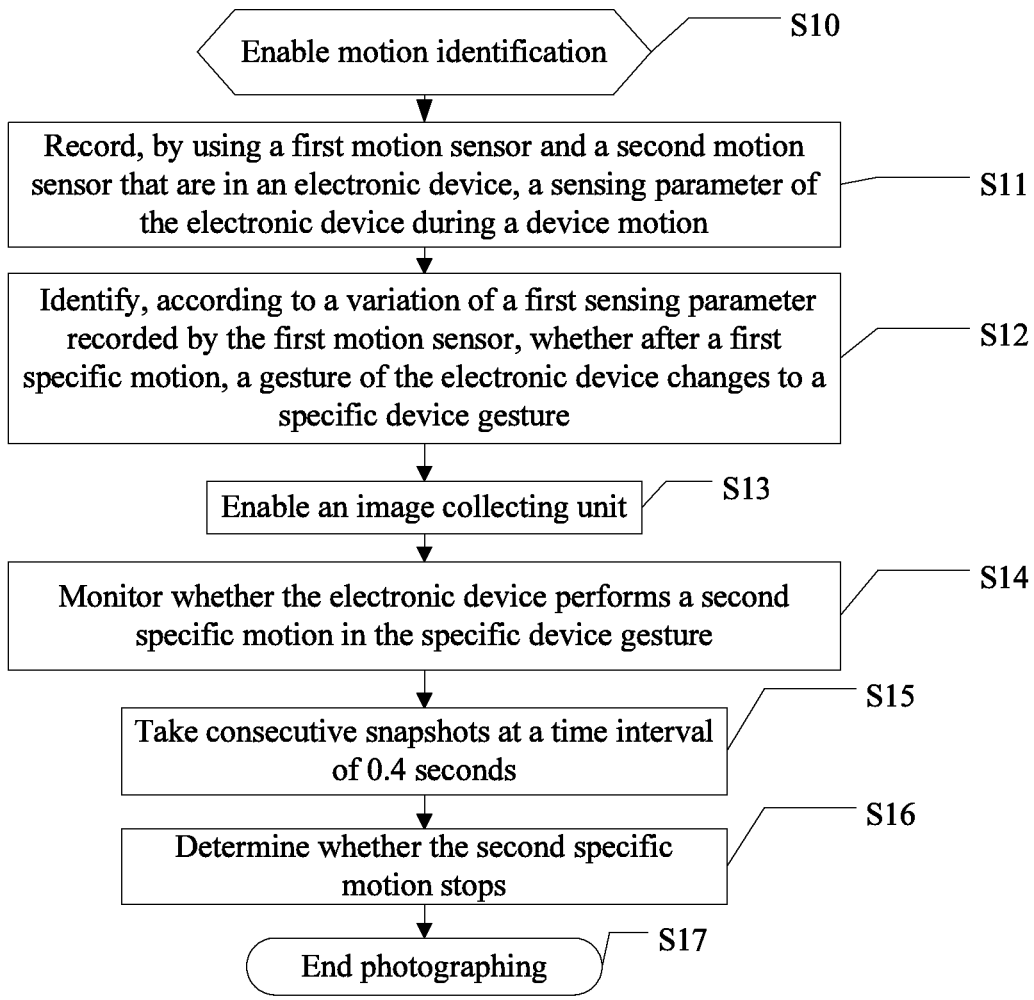
FIG. 2 is a flowchart of an image collecting method in which photographing is used as an example according to an embodiment of the present disclosure.

For example, it is assumed that the electronic device is a smartphone with a photographing function, and an example that the smartphone takes a snapshot is used in the following. Referring to FIG. 2, a procedure of an image collecting method provided in an embodiment of the present disclosure is described using an example, which is not used as a limitation on the present disclosure.

S10: Enable a motion identification state.

S11: Record, using a first motion sensor and a second motion sensor that are in an electronic device, a sensing parameter of the electronic device during a device motion.

S12: Identify, according to a variation of a first sensing parameter recorded by the first motion sensor, whether after a first specific motion, a gesture of the electronic device changes to a specific device gesture; and if yes, perform S13.

S13: Enable an image collecting unit.

S14: Monitor whether the electronic device performs a second specific motion in the specific device gesture; if yes, perform S15; otherwise, proceed to S17.

S15: Take consecutive snapshots at a time interval of 0.4 seconds.

S16: Determine whether the second specific motion stops; if yes, proceed to S17; otherwise, continue to perform S15.

S17: End photographing.

Figure 3:
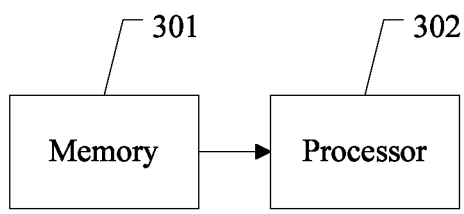
FIG. 3 is a functional block diagram of an electronic device according to an embodiment of the present disclosure.

Based on a same inventive concept, an embodiment of the present disclosure further provides an electronic device. Referring to FIG. 3, the electronic device in this embodiment of the present disclosure includes the following structure: a memory 301 configured to store a program instruction; and a processor 302 configured to acquire the program instruction, so as to perform the following steps: enabling an image collecting unit in the electronic device, when it is identified that after a first specific motion, a gesture of the electronic device changes to a specific device gesture; monitoring whether the electronic device performs a second specific motion in the specific device gesture; and when it is detected that the electronic device performs the second specific motion in the specific device gesture, controlling the image collecting unit to obtain an at least first image by means of collection within motion time in which the electronic device performs the second specific motion.

Preferably, the processor 302 is configured to monitor whether the second specific motion is a motion between which and the first specific motion a time interval is less than set duration.

Preferably, the processor 302 is configured to, in a process that after a first device motion, the electronic device changes from a first device gesture to the specific device gesture, acquire, using a first motion sensor in the electronic device, a first sensing parameter of the electronic device in a process of the first device motion; determine, according to a variation of the first sensing parameter, whether the first device motion is the first specific motion; and if yes, enable the image collecting unit.

Preferably, the processor 302 is configured to perform characteristic extraction on the first sensing parameter and determine a first motion characteristic of the first device motion; input the first motion characteristic into a first motion calculation model for calculation, where the first motion calculation model is a calculation model obtained using an SVM algorithm to analyze historical data that is generated when the electronic device performs the first specific motion for multiple times; and determine, according to a calculation result, whether the first device motion is the first specific motion.

Preferably, the processor 302 is further configured to, within the motion time of the second specific motion, control the image collecting unit to perform one photographing action at a preset time interval, so as to obtain, by means of collection, multiple photos including the at least first image; or within the motion time of the second specific motion, control the image collecting unit to perform video recording, so as to acquire, by means of collection, a video including the at least first image.

Preferably, the processor 302 is further configured to, when the electronic device performs the second device motion in the specific device gesture, acquire, using a second motion sensor in the electronic device, a second sensing parameter at a current moment; and input the second sensing parameter into a second motion calculation model for calculation, so as to determine whether the electronic device at the current moment is in a process of performing the second specific motion in the specific device gesture, where the second motion calculation model is a calculation mode obtained using an SVM algorithm to analyze historical data that is generated when the electronic device performs the second specific motion for multiple times.

Figure 4:
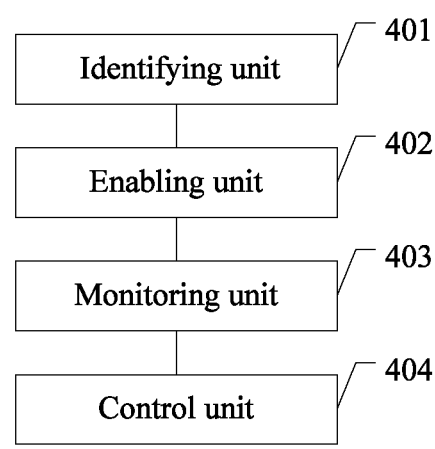
FIG. 4 is a functional block diagram of an apparatus according to an embodiment of the present disclosure.

Based on a same inventive concept, an embodiment of the present disclosure further provides an apparatus. Referring to FIG. 4, the apparatus in this embodiment of the present disclosure includes the following structure: an identifying unit 401 configured to identify that after a first specific motion, a gesture of an electronic device changes to a specific device gesture; an enabling unit 402 configured to enable an image collecting unit in the electronic device, when the identifying unit 401 identifies that after the first specific motion, the gesture of the electronic device changes to the specific device gesture; a monitoring unit 403 configured to monitor whether the electronic device performs a second specific motion in the specific device gesture; and a control unit 404 configured to, when the monitoring unit 403 detects that the electronic device performs the second specific motion in the specific device gesture, control the image collecting unit to obtain an at least first image by means of collection within motion time in which the electronic device performs the second specific motion.

Preferably, the monitoring unit 403 is configured to monitor whether the second specific motion is a motion between which and the first specific motion a time interval is less than set duration.

Preferably, the identifying unit 401 includes a first acquiring subunit configured to, in a process that after a first device motion, the electronic device changes from a first device gesture to the specific device gesture, acquire, using a first motion sensor in the electronic device, a first sensing parameter of the electronic device in a process of the first device motion; and a determining subunit configured to determine, according to a variation of the first sensing parameter, whether the first device motion is the first specific motion; where the enabling unit 402 is configured to, if the determining subunit determines that the first device motion is the first specific motion, enable the image collecting unit.

Preferably, the first acquiring subunit is configured to perform characteristic extraction on the first sensing parameter and determine a first motion characteristic of the first device motion; input the first motion characteristic into a first motion calculation model for calculation, where the first motion calculation model is a calculation model obtained using an SVM algorithm to analyze historical data that is generated when the electronic device performs the first specific motion for multiple times; and determine, according to a calculation result, whether the first device motion is the first specific motion.

Preferably, the control unit 404 is configured to, within the motion time of the second specific motion, control the image collecting unit to perform one photographing action at a preset time interval, so as to obtain, by means of collection, multiple photos including the at least first image; or within the motion time of the second specific motion, control the image collecting unit to perform video recording, so as to acquire, by means of collection, a video including the at least first image.

Preferably, the monitoring unit 403 includes a second acquiring subunit configured to, when the electronic device performs the second device motion in the specific device gesture, acquire, using a second motion sensor in the electronic device, a second sensing parameter at a current moment; and a determining subunit configured to input the second sensing parameter into a second motion calculation model for calculation, so as to determine whether the electronic device at the current moment is in a process of performing the second specific motion in the specific device gesture, where the second motion calculation model is a calculation model obtained using an SVM algorithm to analyze historical data that is generated when the electronic device performs the second specific motion for multiple times.

One or more embodiments of the present disclosure may achieve the following technical effects.

According to the present disclosure, an image collecting unit in an electronic device is enabled when it is identified that after a first specific motion, a gesture of the electronic device changes to a specific device gesture; whether the electronic device performs a second specific motion in the specific device gesture is monitored; and when it is detected that the electronic device performs the second specific motion in the specific device gesture, the image collecting unit is controlled to obtain an at least first image by means of collection within motion time in which the electronic device performs the second specific motion. Therefore, it can be learned that when identifying the first specific motion, the electronic device can automatically enable the image collecting unit and enter a state of preparing for image collection, and then the electronic device can perform image collection within the motion time of the identified second specific motion. Therefore, in a process of a user action, the electronic device can automatically enable the image collecting unit to complete photographing, which avoids a problem that the electronic device can perform image collection only after the user action is completed, thereby implementing a quick and natural automatic snapshot.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or any other programmable data processing device, so that a series of operations and steps are performed on the computer or any other programmable device, so as to generate computer-implemented processing. Therefore, the instructions executed on the computer or any other programmable device provide steps for implementing a specific function in one or more processes in the flowcharts and/or in one or more blocks in the block diagrams.

Although some exemplary embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is also intended to cover these modifications and variations provided that they fall within the scope defined by the following claims and their equivalent technologies.

What is claimed is:

1. An image collecting method, comprising:
    enabling a computer processor in an electronic device when a gesture of the electronic device changes to a specific device gesture after a first specific motion;
    monitoring whether the electronic device performs a second specific motion in the specific device gesture, wherein the second specific motion comprises a translational motion of moving the electronic device along a directional axis; and
    controlling the computer processor to obtain a first image by collecting within a motion time in which the electronic device performs the second specific motion when the electronic device performs the second specific motion in the specific device gesture,
    wherein the second specific motion is a motion such that a time interval between the second specific motion and the first specific motion is less than a set duration,
    wherein enabling the computer processor in the electronic device when the gesture of the electronic device changes to the specific device gesture after the first specific motion comprises:
        acquiring a first sensing parameter of the electronic device in a process of the first device motion in a process that after a first device motion, the electronic device changes from a first device gesture to the specific device gesture;

determining, according to a variation of the first sensing parameter, whether the first device motion is the first specific motion; and enabling the computer processor when the first device motion is the first specific motion, and wherein determining, according to the variation of the first sensing parameter, whether the first device motion is the first specific motion comprises:

performing characteristic extraction on the first sensing parameter;

determining a first motion characteristic of the first device motion;

inputting the first motion characteristic into a first motion calculation model for calculation, wherein the first motion calculation model is a calculation model obtained using a Support Vector Machine (SVM) algorithm to analyze historical data that is generated when the electronic device performs the first specific motion for multiple times; and determining, according to a calculation result, whether the first device motion is the first specific motion.

2. An image collecting method, comprising:

enabling a computer processor in an electronic device when a gesture of the electronic device changes to a specific device gesture after a first specific motion;

monitoring whether the electronic device performs a second specific motion in the specific device gesture, wherein the second specific motion comprises a translational motion of moving the electronic device along a directional axis; and controlling the computer processor to obtain a first image by collecting within a motion time in which the electronic device performs the second specific motion when the electronic device performs the second specific motion in the specific device gesture, wherein controlling the computer processor to obtain the first image by collecting within the motion time in which the electronic device performs the second specific motion comprises either:

controlling, within the motion time in which the electronic device performs the second specific motion, the computer processor to perform one photographing action at a preset time interval so as to obtain multiple photos comprising the first image; or controlling, within the motion time of the second specific motion, the computer processor to perform video recording so as to acquire a video comprising the first image, and wherein monitoring whether the electronic device performs the second specific motion in the specific device gesture comprises:

acquiring, using a second motion sensor in the electronic device, a second sensing parameter at a current moment when the electronic device performs the second specific motion in the specific device gesture; and inputting the second sensing parameter into a second motion calculation model for calculation, so as to determine whether the electronic device at the current moment is in a process of performing the second specific motion in the specific device gesture, wherein the second motion calculation model is a calculation model obtained using a Support Vector Machine (SVM) algorithm to analyze historical data that is generated when the electronic device performs the second specific motion for multiple times.

3. An electronic device, comprising:

a memory configured to store a program instruction; and a processor configured to acquire the program instruction, so as to perform the following steps:

enabling a camera in the electronic device when a gesture of the electronic device changes to a specific device gesture after a first specific motion;

monitoring whether the electronic device performs a second specific motion in the specific device gesture, wherein the second specific motion comprises a translational motion of moving the electronic device along a directional axis;

controlling the camera to obtain a first image by collecting within a motion time in which the electronic device performs the second specific motion when the electronic device performs the second specific motion in the specific device gesture;

monitoring whether the second specific motion is a motion such that a time interval between the second specific motion and the first specific motion is less than a set duration;

acquiring a first sensing parameter of the electronic device in a process of the first device motion in a process that after a first device motion, the electronic device changes from a first device gesture to the specific device gesture, using a first motion sensor in the electronic device;

determining, according to a variation of the first sensing parameter, whether the first device motion is the first specific motion;

enabling the camera when the first device motion is the first specific motion;

performing characteristic extraction on the first sensing parameter;

determining a first motion characteristic of the first device motion;

inputting the first motion characteristic into a first motion calculation model for calculation, wherein the first motion calculation model is a calculation model obtained using a Support Vector Machine (SVM) algorithm to analyze historical data that is generated when the electronic device performs the first specific motion for multiple times; and determining, according to a calculation result, whether the first device motion is the first specific motion.

4. An electronic device, comprising:

a memory configured to store a program instruction; and a processor configured to acquire the program instruction, so as to perform the following steps:

enabling a camera in the electronic device when a gesture of the electronic device changes to a specific device gesture after a first specific motion;

monitoring whether the electronic device performs a second specific motion in the specific device gesture, wherein the second specific motion comprises a translational motion of moving the electronic device along a directional axis;

controlling the camera to obtain a first image by collecting within a motion time in which the electronic device performs the second specific motion when the electronic device performs the second specific motion in the specific device gesture;

either controlling, within the motion time of the second specific motion, the camera to perform one photographing action at a preset time interval so as to obtain multiple photos comprising the first image, or controlling within the motion time of the second specific motion, the camera to perform video recording so as to acquire a video comprising the first image;

acquiring using a second motion sensor in the electronic device, a second sensing parameter at a current moment when the electronic device performs the second specific motion in the specific device gesture; and inputting the second sensing parameter into a second motion calculation model for calculation so as to determine whether the electronic device at the current moment is in a process of performing the second specific motion in the specific device gesture, wherein the second motion calculation model is a calculation model obtained using a Support Vector Machine (SVM) algorithm to analyze historical data that is generated when the electronic device performs the second specific motion for multiple times.

5. An apparatus, comprising:

a non-transitory computer readable medium having instructions stored thereon; and a computer processor coupled to the non-transitory computer readable medium and configured to execute the instructions to:

identify whether a gesture of an electronic device changes to a specific device gesture after a first specific motion;

enable a camera in the electronic device when the gesture of the electronic device changes to the specific device gesture after the first specific motion;

monitor whether the electronic device performs a second specific motion in the specific device gesture, wherein the second specific motion comprises a translational motion of moving the electronic device along a directional axis;

control the camera to obtain a first image by collecting within a motion time in which the electronic device performs the second specific motion when monitoring that the electronic device performs the second specific motion in the specific device gesture;

monitor whether the second specific motion is a motion such that a time interval between the second specific motion and the first specific motion is less than a set duration;

acquire, using a first motion sensor in the electronic device, a first sensing parameter of the electronic device in a process of the first device motion in a process that after a first device motion, the electronic device changes from a first device gesture to the specific device gesture;

determine, according to a variation of the first sensing parameter, whether the first device motion is the first specific motion;

enable the camera when the first device motion is the first specific motion;

perform characteristic extraction on the first sensing parameter and determine a first motion characteristic of the first device motion;

input the first motion characteristic into a first motion calculation model for calculation, wherein the first motion calculation model is a calculation model obtained using a Support Vector Machine (SVM) algorithm to analyze historical data that is generated when the electronic device performs the first specific motion for multiple times; and determine, according to a calculation result, whether the first device motion is the first specific motion.

6. An apparatus, comprising:

a non-transitory computer readable medium having instructions stored thereon; and a computer processor coupled to the non-transitory computer readable medium and configured to execute the instructions to:

identify whether a gesture of an electronic device changes to a specific device gesture after a first specific motion;

enable a camera in the electronic device when the gesture of the electronic device changes to the specific device gesture after the first specific motion;

monitor whether the electronic device performs a second specific motion in the specific device gesture, wherein the second specific motion comprises a translational motion of moving the electronic device along a directional axis;

control the camera to obtain a first image by collecting within a motion time in which the electronic device performs the second specific motion when monitoring that the electronic device performs the second specific motion in the specific device gesture;

either control, within the motion time of the second specific motion, the camera to perform one photographing action at a preset time interval so as to obtain multiple photos comprising the first image, or control, within the motion time of the second specific motion, the camera to perform video recording so as to acquire a video comprising the first image;

acquire, using a second motion sensor in the electronic device, a second sensing parameter at a current moment when the electronic device performs the second specific motion in the specific device gesture; and input the second sensing parameter into a second motion calculation model for calculation so as to determine whether the electronic device at the current moment is in a process of performing the second specific motion in the specific device gesture, wherein the second motion calculation model is a calculation model obtained using a Support Vector Machine (SVM) algorithm to analyze historical data that is generated when the electronic device performs the second specific motion for multiple times.

* * * * *